US008480472B2

(12) United States Patent
Seaton et al.

(10) Patent No.: US 8,480,472 B2
(45) Date of Patent: Jul. 9, 2013

(54) SYSTEM AND METHOD FOR CONDUCTING A WAGERING GAME HAVING A MULTI-SPOT TEMPLATE

(76) Inventors: Kit Seaton, Billings, MT (US); Jeff Sandridge, Billings, MT (US); Walter Crowley, Greelay, CO (US); Daniel Dale, Brighton, CO (US)

( * ) Notice: Subject to any disclaimer, the term of this patent is extended or adjusted under 35 U.S.C. 154(b) by 0 days.

(21) Appl. No.: 13/039,278

(22) Filed: Mar. 2, 2011
(Under 37 CFR 1.47)

(65) Prior Publication Data

US 2012/0252550 A1 Oct. 4, 2012

Related U.S. Application Data

(60) Provisional application No. 61/310,641, filed on Mar. 4, 2010.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ................................ 463/18; 463/16; 273/269

(58) Field of Classification Search
USPC ................................ 463/16–20; 273/269, 274
See application file for complete search history.

(56) References Cited

U.S. PATENT DOCUMENTS

| | | | | |
|---|---|---|---|---|
| 3,873,092 | A * | 3/1975 | Fagan | 273/138.1 |
| 3,913,921 | A * | 10/1975 | Bourassa | 273/269 |
| 4,498,671 | A * | 2/1985 | Kostow | 273/144 B |
| 4,695,057 | A * | 9/1987 | McCullen | 273/269 |
| 5,813,911 | A * | 9/1998 | Margolin | 463/19 |
| 6,277,025 | B1 * | 8/2001 | Margolin | 463/18 |
| 6,309,299 | B1 * | 10/2001 | Weiss | 463/20 |
| 6,368,213 | B1 * | 4/2002 | McNabola | 463/18 |
| 6,656,044 | B1 * | 12/2003 | Lewis | 463/19 |
| 7,708,634 | B2 * | 5/2010 | Padgett | 463/19 |
| 2001/0031659 | A1 * | 10/2001 | Perrie et al. | 463/18 |
| 2005/0043079 | A1 * | 2/2005 | Huang | 463/19 |
| 2005/0075162 | A1 * | 4/2005 | Duhamel | 463/20 |

* cited by examiner

*Primary Examiner* — Milap Shah
(74) *Attorney, Agent, or Firm* — Lathrop & Gage LLP

(57) ABSTRACT

A device includes a data processor executing program instructions for a wagering game. The program instructions include receiving a wager and a selection set from a player. A selection is received from the player, or randomly chosen, to locate a multi-spot template comprising a pattern of multiple spots on a matrix. An outcome set is selected and the player is rewarded in accordance with a pay table for matches between the selection set and the outcome set. The multi-spot templates are examined for a bonus trigger condition such as all the spots in the multi-spot template containing members of the outcome set. If a bonus trigger condition is fulfilled, a bonus feature is conducted.

14 Claims, 6 Drawing Sheets

SYSTEM AND METHOD FOR CONDUCTING A WAGERING GAME HAVING A MULTI-SPOT TEMPLATE

RELATED APPLICATIONS

This application claims priority to U.S. Patent Application Ser. No. 61/310,641, filed Mar. 4, 2010, and incorporated herein by reference.

BACKGROUND

Numbers games are well known in the art. Essentially a numbers game consists of a player selecting one or more numbers from a closed set and placing a wager. The house randomly selects a set of numbers and, if the player's selection matches the house's selection, the player is rewarded.

The most well known numbers game is "racehorse keno," referred to in casinos as merely "keno." Keno uses an eighty number game set, typically the numbers one through eighty. A keno ticket includes a matrix with the eighty numbers of the game set and the player designates a selection set by marking the numbers of the player's selection set on the keno ticket. Keno tickets may be in paper and/or electronic form. Paper tickets may be punched, daubed, or otherwise marked to identify the player's selection set. Alternatively, a keno machine may include a display on which a keno ticket is displayed. The player may use a touch-screen, pointer, mouse, button panel, keyboard or keypad, or other input device to input the player's selection set. The size of the selection set may be decided by the player, although the potential payouts may relate to the size of the selection set and the number of "catches," i.e. matches between the player's selection set and a randomly selected outcome set.

An outcome set is selected from the game set and compared to the player's selection set. In a typical keno game, the outcome set includes twenty numbers randomly selected from the eighty numbers on a keno board. A number within the player's selection set is "caught" if the number matches a number within the outcome set. For example, if the player's selection set includes the five numbers 3, 5, 10, 22, and 73, and the outcome set includes the twenty numbers 1, 5, 8, 13, 15, 19, 22 26, 27, 33, 35, 40, 49, 53, 54, 58, 65, 70, 73, and 78, the player has caught the numbers 5, 22, and 73 since those numbers appear in both the player's selection set and the randomly selected outcome set. The selection set and the caught numbers determine which, if any, of the player's wagers are rewarded.

In conventional keno, players may wager any amount on a keno ticket. Wagers in keno can be generally divided into two groups, spot and way. Spot wagers consist merely of the player selecting individual numbers, or spots, on a keno ticket. If a player catches a predetermined number of spots, the player is rewarded. For example, on a ten-spot keno ticket, the player selects and marks ten numbers. A reward is typically issued if the player catches five or more spots. Typically, the reward increases with the number of spots the player catches. For example, if the player catches five spots, the player may receive his wager back; if the player catches ten spots, the player may be paid at ten thousand to one.

Way wagers consist of a player selecting groups of numbers, or ways, on a keno ticket. If a player catches a predetermined number of spots, the player is rewarded. Unlike spot wagers, however, the reward in a way wager depends on how the spots the player catches are distributed. For example, on a hi-low way keno ticket, the player selects and marks three groups of four numbers. If a player catches five or more spots, the player is rewarded. However, the size of the reward depends on the distribution of the spots. For example, if the spots are distributed with two in one way, two in another way, and one in yet another way (2-2-1), the player's wager is returned. Alternatively, if the spots are distributed 3-1-1, the player may be paid at 1.2:1; if the spots are distributed 4-1, the player may be rewarded at 1.4:1. Generally, way wagers are not offered in keno games conducted at an electronic gaming machine.

One known improvement to electronic keno is the designation of bonus numbers. For example, certain numbers on the keno board (whether or not selected by a player) may be designated as bonus numbers. If a bonus number is caught, a bonus payout or other bonus feature is conducted.

SUMMARY OF THE INVENTION

A device for conducting a casino game includes a display and a player interface in communication with a data processor. The player interface includes an input device. Additionally, a data storage device communicates with the data processor. The data storage device stores game graphics, including a game set, a matrix representing a keno card, at least one bonus trigger condition and a bonus feature associated with the bonus trigger condition, and parameters for conducting a game such as pay tables. At least one multi-spot template is defined and stored at the data storage. The multi-spot template is a pattern containing at least two spots that may be placed in the matrix of the keno card. Optionally, the spots of a multi-spot template are adjacent, although in an alternate embodiment, the spots of a multi-spot template are not adjacent.

The data storage device also stores program instructions executable by the data processor to conduct a game. According to one embodiment, the data processor receives at least one wager and a selection set from a player the player interface. The data processor also receives a selection by the player to locate the multi-spot template within the matrix of the keno card.

The data processor randomly selects an outcome set and displays the outcome set on the display. Optionally, matches between the outcome set and the player selection set are identified on the display and any reward associated with the matches is issued to the player. Spots in the outcome set that fall within the multi-spot template located by the player are identified on the display. A determination is made whether a bonus trigger condition has been fulfilled. In an optional embodiment, the trigger condition includes all the spots in the multi-spot template being filled by spots in the outcome set. If a bonus trigger condition has been fulfilled, the bonus feature associated with the bonus trigger condition is conducted. The bonus feature may take any form, including a bonus payout, a payout multiplier, free draws or spins, a secondary or bonus game, one or more free games, or any other reward.

In one embodiment, a computer-implemented system conducts a wagering game played by a player using a game set including a plurality of spots thereon. The system includes a multi-spot template, stored within a memory, having a predefined shape for covering a predefined number of spots on the game set, and an input device for receiving, from the user, (1) a selection set comprising a plurality of the spots on the game set and (2) a location, on the game set, of the multi-spot template.

In another embodiment, a method conducts a wagering game with a player on a wagering game system having a game set including a plurality of spots thereon and a multi-spot template having a predefined shape for covering a predefined number of spots on the game set. A selection set comprising a plurality of the spots on the game set and a location, on the game set, of the multi-spot template are received interactively from the player using an input device of the wagering game system. An outcome set based upon the game set is determined within the wagering game system. The spots of the game set covered by the multi-spot template at the location are compared within the wagering game system to the outcome set to determine a number of template covered outcome set spots and used to determine if a bonus trigger condition is met. A bonus feature is performed if the bonus trigger condition is met.

In another embodiment, a computer-implemented system conducts a wagering game played by a player using a game set including a plurality of spots thereon. The system includes a multi-spot template, stored within a memory, having a predefined shape for covering a predefined number of spots on the game set, and an input device for receiving, from the user, a selection set comprising a plurality of the spots on the game set. The multi-spot template is automatically located at a random and valid position on the game set for each wagering game.

DETAILED DESCRIPTION OF THE EMBODIMENTS

Reference is now made to the figures wherein like parts are referred to by like numerals throughout. Referring generally to the figures, the present invention includes a device and method for conducting a wagering game. A device according to an embodiment of the present invention may take any form. For example, a device may take the form of a personal computer, electronic gaming machine, kiosk, handheld device, cellular telephone, or the like.

Figure 1:
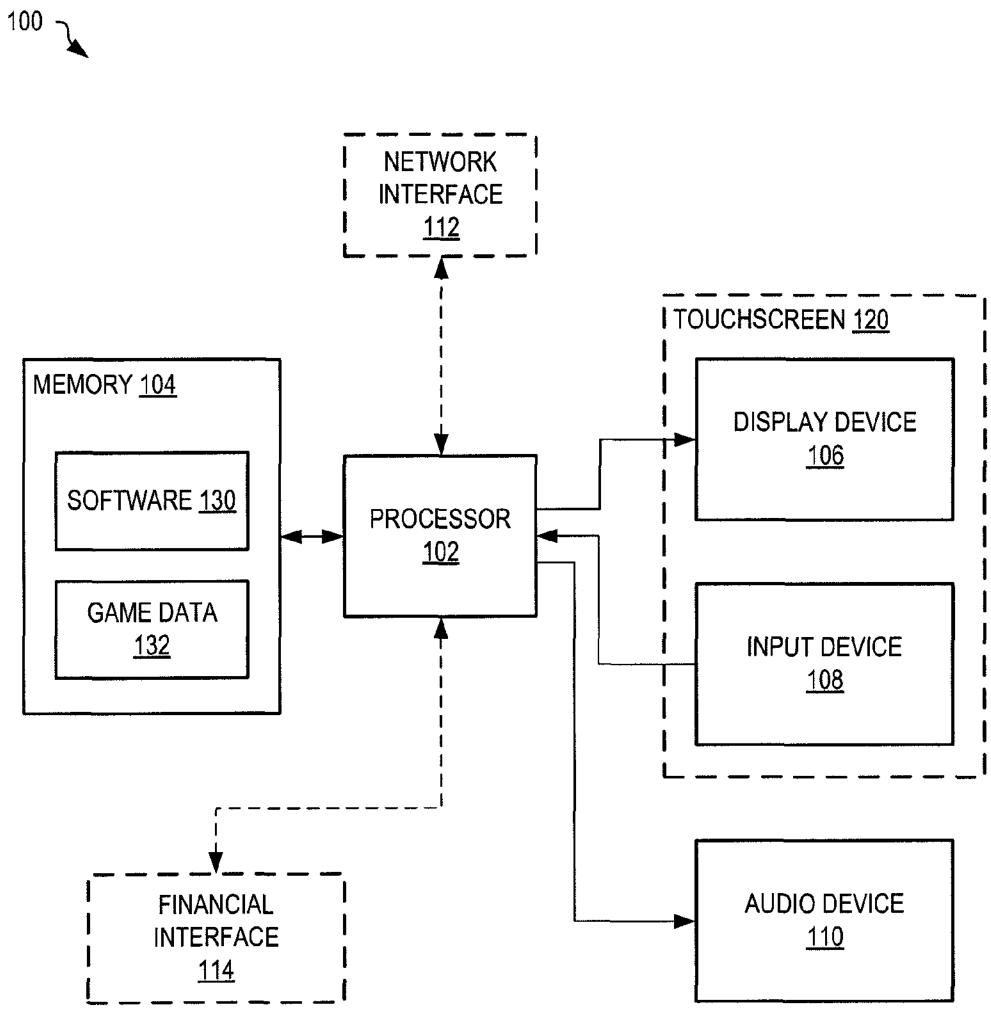
FIG. 1 is a block diagram illustrating one exemplary device for conducting a wagering game, in an embodiment.

FIG. 1 is a block diagram illustrating one exemplary system 100 for conducting a wagering game. System 100 includes a processor 102, a memory 104, a display device 106, an input device 108, and an audio device 110. Audio device 110 is for example an amplifier and at least one speaker or other sound actuator.

Display device 106 may represent one or more of a liquid-crystal display (LCD), a cathode ray tube (CRT), plasma, light emitting diode (LED), or other display medium that may be controlled electronically. It is noted that display device 106 may communicate with processor 102 directly or via an intermediate controller, such as a video card or the like. Input device 108 may represent one or more of input buttons, keyboard, keypad, joystick, mouse, pointer, graphical pad, and other devices that allow a player to input information into system 100. In one embodiment, display device 106 and input device 108 form a touch screen interface 120. Input device 108 may function to receive financial information from the player and display device 106 may display rewards to the player. For example, a player may "log in" to system 100 and access stored credits.

Memory 104 may represent one or more of random access memory (RAM), read only memory (ROM), electrically erasable programmable read-only memory (EEPROM), FLASH memory, magnetic storage (e.g., a hard disk drive), and optical storage (e.g., CDROM and/or DVD drive). Memory 104 is illustratively shown storing software 130 that comprises machine readable instructions, that when executed by processor 102, allow system 100 to conduct a wagering game with the player. Memory 104 may also store graphical images, animations, and other visual files for display on display device 106 and may store audio data and files for producing sound using audio device 110. In one embodiment, memory 104 stores animation data that includes audio information and is played on both display device 106 and audio device 110.

Optionally, system 100 may include a network interface 112 for interfacing with one or more servers, and/or other gaming devices. Network interface 112 may represent one or both of a wired network Interface (e.g., Ethernet) and a wireless network interface (e.g., WiFi). System 100 may also include a financial interface 114 for receiving and distributing finances. Financial interface 114 may represent one or more of a card reader/writer, a coin receiver, a bill receiver, and a payout device. For example, the player may insert coins and bank notes to buy credits for playing system 100, and may receive one or more of coins, tokens, and receipts for winnings earned from system 100. Memory 104 also stores game data 132 that represents data, stored as one or more files and/or tables, for conducting the wagering game of system 100.

Figure 2:
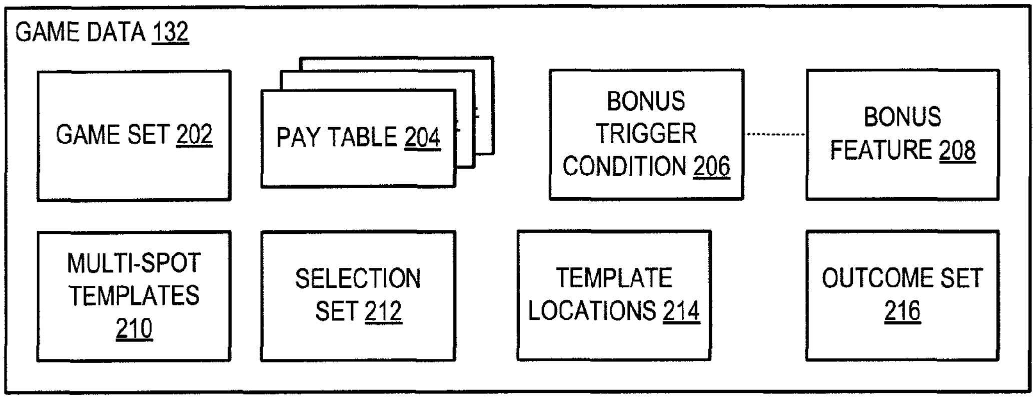
FIG. 2 shows the game data of the system of FIG. 1 in further detail.

FIG. 2 shows game data 132 of FIG. 1 in greater detail. FIGS. 1 and 2 are best viewed together with the following description. In a conventional game of keno, a game set consists of eighty numbers (usually the numbers one through eighty, inclusive), also referred to as 'spots' herein. Accordingly, game data 132 within memory 104 may include a game set 202 that has an array of eighty sequentially numbered spots. A player selects a defined number (e.g., 20) of spots to form a selection set 212, also stored within game data 132, with which to play the wagering game. System 100 generates an outcome set 216 that includes a defined number (e.g., 20) of randomly selected unique spots from game set 202. Pay table 204 defines payouts by system 100 based upon possible matches (e.g., a number of spots common to both sets) between selection set 212 and outcome set 216. Other sizes and ranges of numbers for game set 202 and outcome set 216 may be used without departing from the scope hereof. For example, in a game based upon Bingo, game set 202 may include the numbers one through seventy-five.

Game data 132 also includes multi-spot templates 210 that may be selected for play by the player and positioned within game set 202 such as to define one or more template locations 214. As discussed in greater detail below, game data 132 may define at least one bonus trigger condition 206 and at least one bonus feature 208 associated with bonus trigger condition 206. Multi-spot templates and template locations are described in further detail below. Game data 132 includes one or more pay tables 204 that correlate outcomes in the wagering game with rewards to be issued to the player.

Display device 106 may display one or more of game set 202, selection set 212, outcome set 216, and one or more of multi-spot templates 210. The functions of the selection set 212, outcome set 216, and multi-spot templates 210 are described in greater detail below.

Figure 3:
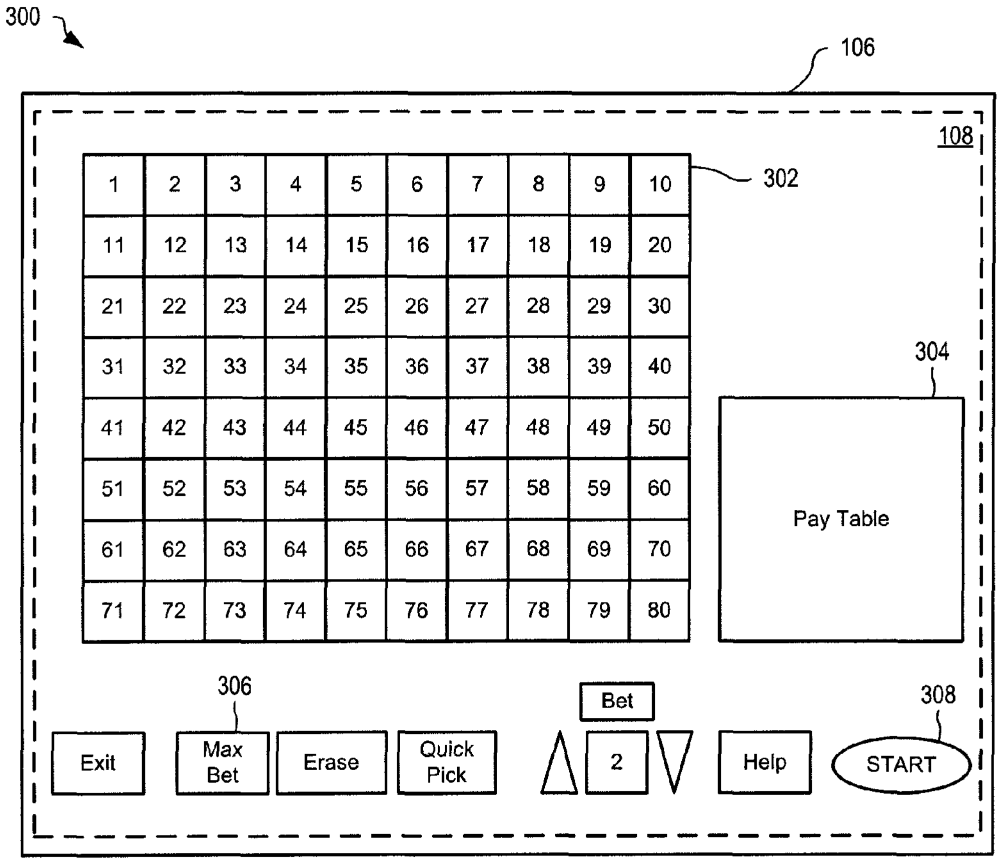
FIG. 3 shows the display device and the input device of FIG. 1 forming a touch-screen and displaying an exemplary keno card, in an embodiment.

FIG. 3 shows display device 106 having a graphical representation of a keno card 302 formed as an array of ten columns of eight rows of spots numbered consecutively as shown, a pay table area 304 that displays payout values for particular number matches, and a plurality of control "buttons." Keno card 302 is a graphical representation of game set 202. In the example of FIG. 3, display 106 is overlaid by input device 108 to form a touch-screen 300.

Figure 4:
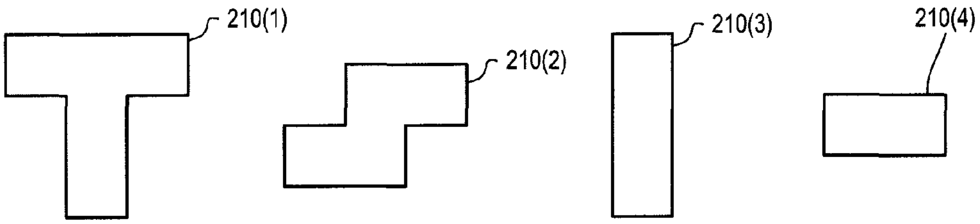
FIG. 4 shows exemplary multi-spot templates that may be positioned by the player within the keno card of FIG. 3, and thereby referenced to the game set of FIG. 2.

FIG. 4 shows exemplary multi-spot templates 210(1-4) that may be positioned by the player within keno card 302 of FIG. 3, and thereby referenced to game set 202 of FIG. 2. Template 210(1) is formed to cover five spots of keno card 302; template 210(2) is formed to cover four spots of keno card 302; template 210(3) is formed to cover three spots of keno card 302; and template 210(4) is formed to cover two spots of keno card 302. The player may interactively position one or more templates 210 on keno card 302. In one example, the player positions template 210(1) to cover spots numbered 41, 42, 43, 52, and 62. In another example, the player positions template 210(3) to cover spots 53, 63, and 73. The location of each template 210 selected and positioned by the player is stored within template locations 214 of game data 132.

Where the player has positioned one or more templates 210 within keno card 302, once outcome set 216 has been determined, system 100 evaluates each positioned template 210 against outcome set 216 to determine one or more of a reward and whether a bonus trigger condition 206 has been met.

Although four pre-defined templates 210 are shown in FIG. 4, templates 210 consist of an number of spots in any configuration, and spots need not be adjacent to one another as shown. Multi-spot templates 210 may be placed on keno card 302 independently on one another and independently of numbers selected for selection set 212. In one embodiment, system 100 prohibits overlaying of templates 210 on other templates. In another embodiment, system 100 prohibits overlaying of templates 210 on number selected for selection set 212. In another embodiment, templates 210 are automatically placed within keno card 302 by processor 102 and the positions of templates 210 may or may not be displayed on keno card 302. In one example, processor 102 displays automatically positioned templates 210 on keno card 302 after the current game ends.

Figure 5:
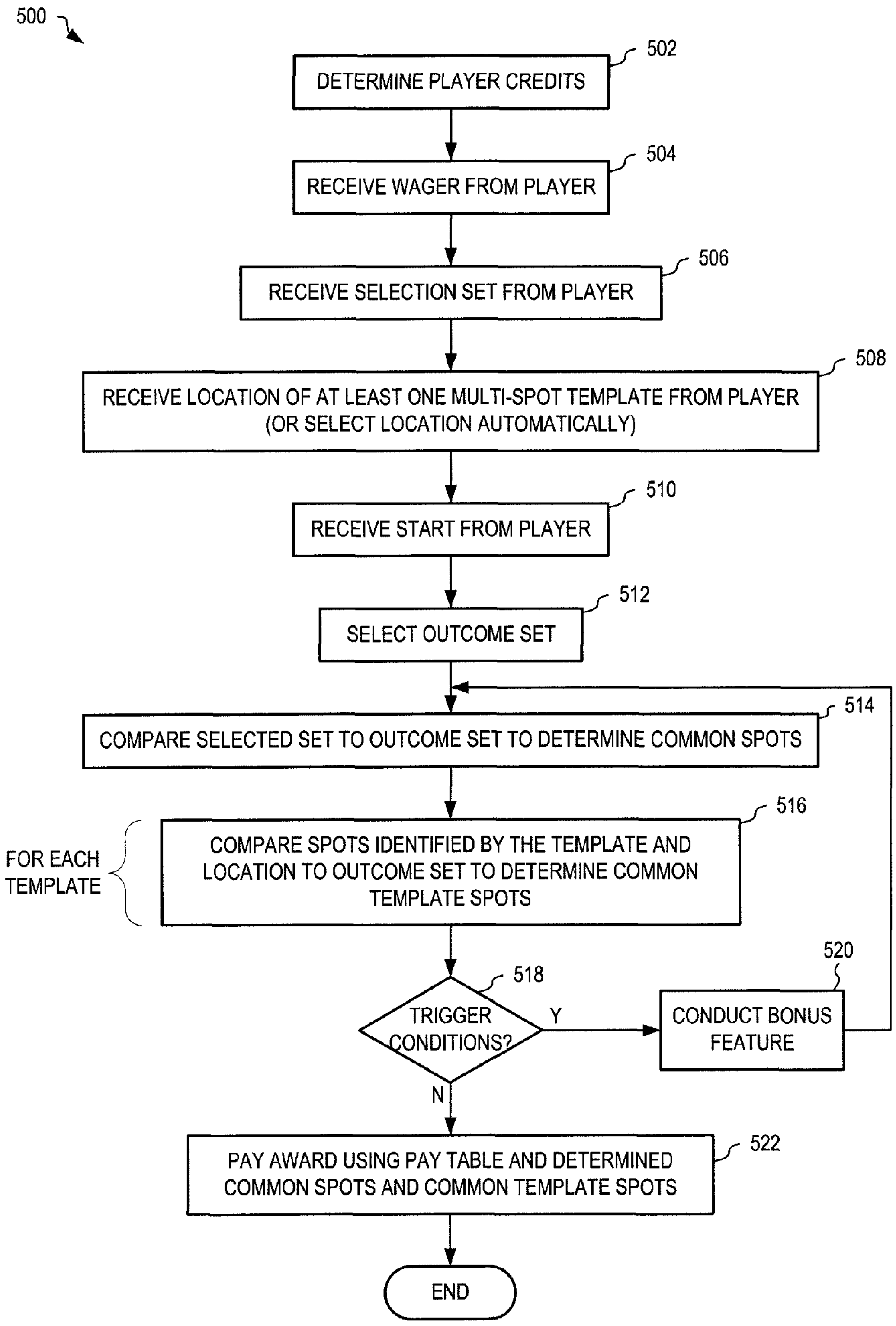
FIG. 5 is a flowchart illustrating one exemplary method for conduction a wagering game, in an embodiment.

FIG. 5 is a flowchart illustrating one exemplary method 500 for conducting a wagering game on system 100 of FIG. 1. Method 500 is for example implemented as instructions that are executable by processor 102 and stored as software 130 within memory 104 of system 100.

In step 502, method 500 determines the number of credits available to the player with which to conduct the wagering game. In one example of step 502, processor 102 determines that the player has sufficient credits stored within memory 104 to conduct the current wagering game. In another example of step 502, the player inserts a wager (e.g., a bill, coin, ticket, or the like) into financial interface 114 and system 100 stores and displays a total number of credits available to the player. In another example of step 502, the player inserts a magnetic card into a reader of financial interface 114, wherein financial interface 114 determines pre-stored credits of the card and transfers these credits to system 100 where they are stored within memory 104 and displayed on display device 106. In another example, the player inserts an electronic card into financial interface 114, which reads the card and determines an identity of the player, wherein processor 102 retrieves a financial value from a financial server connected to system 100 via network interface 112 and applies the financial value purchase credits that are then displayed on display device 106. The financial server may represent a store of credits registered to the player.

In step 504, method 500 receives a wager from the player. In one example of step 504, system 100 receives player input via input device 108 indicating a number of credits to wager on the current game. In another example of step 504, the player operates input device 108 to increase and decrease the number of credits to wager on the current game. In another example of step 504, the player selects a "Max Bet" button 306 to set the number of credits to wager on the current game.

Figure 6:
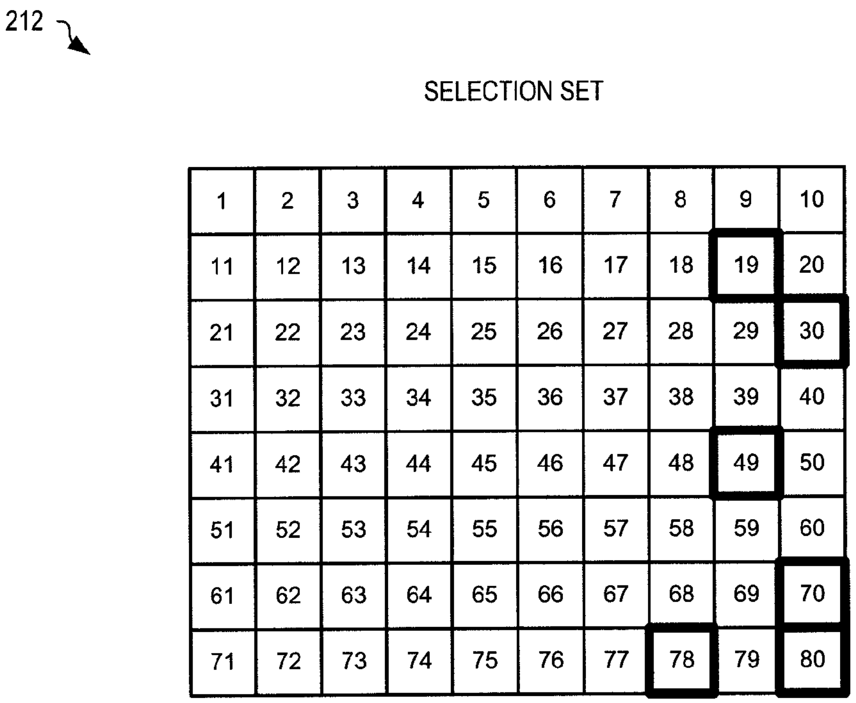
FIG. 6 shows one exemplary selection set having six spots selected from the keno card of FIG. 3.

In step 506, method 500 receives a selection set 212 from the player. In one example of step 506, the player interactively selects desired spots from keno card 302 using the touch-screen formed by display device 106 and input device 108. FIG. 6 shows one exemplary selection set 212 having six spots (shown in heavy outline) numbered 19, 30, 49, 70, 78, and 80, selected from keno card 302. The player may select number of selection set 212 by touching the touch-screen in a location associated with the desired spot. In another example of step 506, the player elects, using input device 108 and/or financial interface 114, to use a previously stored (e.g., within memory 104 and/or on an inserted card) selection set. The number of spots in the selection set (e.g., the quantity of selections received from the player) may be fixed or may vary. In one example, the size of selection set 212 is determined by the player and a desired wager. In another example, the player may enter a desired quantity of sports for selection set 212 and pay table 204 is automatically selected based upon the quantity entered into selection set 212. In this example, pay table 204 is displayed upon display device 106 such that the player may see how potential payout changes as selections are made for the selection set.

In another example of step 506, the player indicates, via input device 108, that a random selection set (e.g., generated by processor 102) is requested. In another example, the player indicates, via input device 108, that the selection set of the previous game should be retrieved from memory 104 and used again. Once selected by the player, indication of selection set 212 may be imposed onto keno card 302 of display device 106. In one example, indication of selection set 212 is shown on display device 106 by one or more of reversing, changing colors, outlining, tagging, or other similar indication methods, of the spots (i.e., numbers) contained in selection set 212. Other methods of indicating selection set 212 on keno card 302 may be used without departing from the scope hereof.

Figure 7:
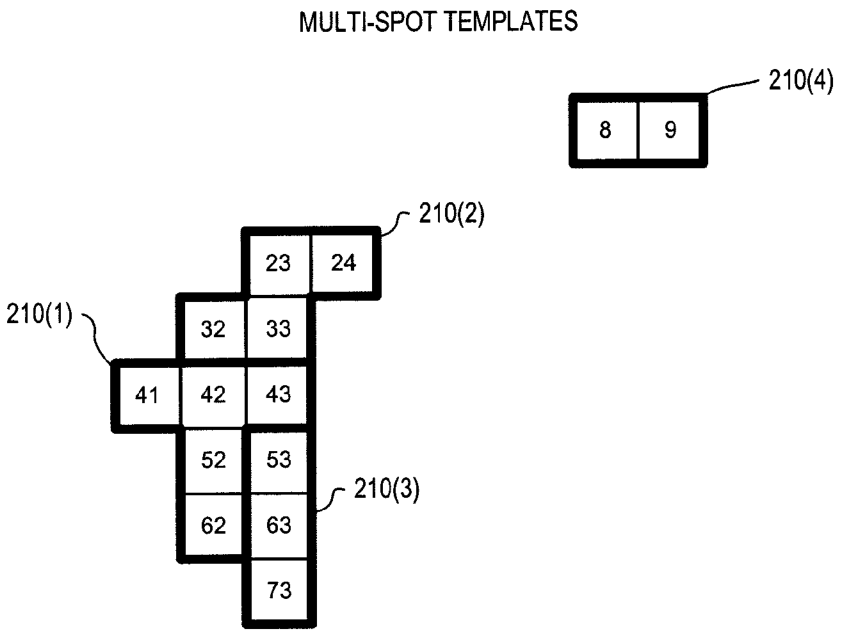
FIG. 7 shows exemplary positioning of the templates of FIG. 4 with reference to numbers of the keno card of FIG. 3.

In step 508, method 500 receives location of at least one multi-spot template from the player. In one example of step 508, the player selects and positions template 210(1) within keno card 302 on display device 106. The player may position template 210(1), once selected, using input device 108 (e.g., by touching the touch-screen formed by display device 106 and input device 108) wherein system 100 indicates position of template 210(1) on keno card 302 by one or more of outline, tagging, overlaying, and other like methods. In one example of operation, the player selects each multi-spot template 210 from a menu displayed by processor 102 on display device 106, and, using input device 110, positions (e.g., by dragging the selected template using touchscreen 120) the selected template onto keno card 302. Template 210, during positioning by the player, may be displayed in green to indicate a valid position on keno card 302, and in red to indicate an invalid position on keno card 302. Wherein, when the player releases (e.g., by lifting the finger from touchscreen 120) the selected multi-spot template 210 at a valid position, the multi-spot template remains in that position, and when the player releases the selected multi-spot template 210 at an invalid position, the multi-spot template returns to the menu for re-selection. FIG. 7 shows exemplary positioning of templates 210(1), 210(2), 210(3), and 210(4) with reference to numbers of keno card 302, FIG. 3. In one embodiment, no additional wager is required for using one or more multi-spot templates 210. In an alternate embodiment, a supplemental, side, or bonus wager may be required from the player before selecting and positioning the one or more multi-spot templates 210.

In an alternate embodiment, step 508 is omitted and each multi-spot template 210 is positioned randomly within keno card 302 by processor 102 (e.g., by executing a pseudo random number generator of software 130) and displayed on display device 108. Whether positioned by the player, or positioned randomly by processor 102, the multi-spot templates 210 are hereafter similarly processed.

Figure 8:
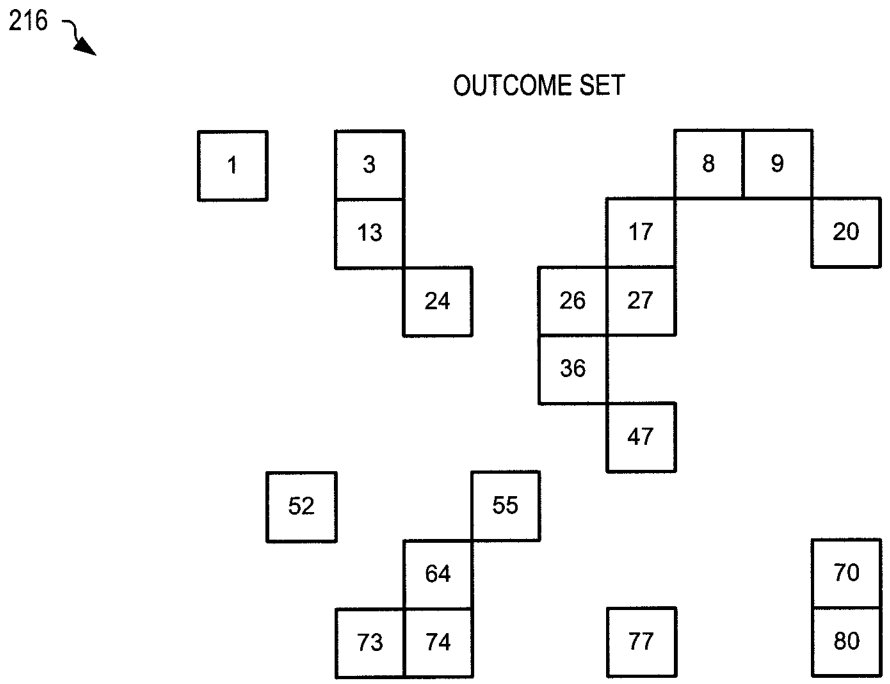
FIG. 8 shows one exemplary outcome set randomly selected by the processor of FIG. 1 and based upon the game set of FIG. 2.

In step 510, method 500 receives a start indication from the player. In one example of step 510, the player selects a start button 308 using input device 108 to indicate that the wagering game should begin. In one embodiment, the wagering game begins automatically when the player selects a max bet button 306. In step 512, method 500 selects an outcome set. FIG. 8 shows one exemplary outcome set 216 that is randomly selected by processor 102 based upon game set 202. For example, software 130 may include a pseudo random number generator that upon execution by processor 102, randomly select spots of game set 202 to form outcome set 216.

Figure 9:
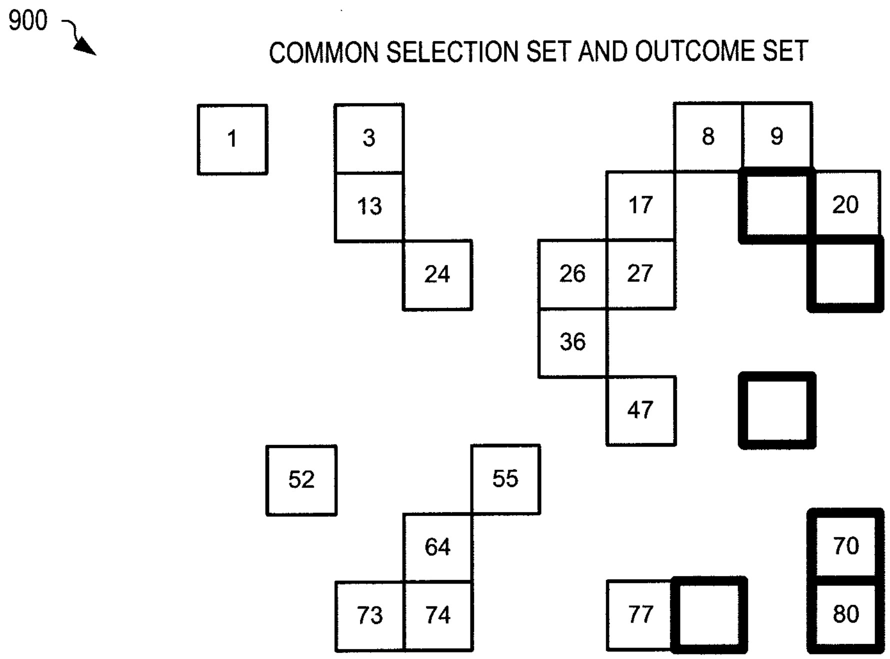
FIG. 9 shows an exemplary overlay of the outcome set of FIG. 8 and the selection set of FIG. 6, illustrating common spots.

In step 514, method 500 compares the selected set to the outcome set to determine common spots. In one example of step 514, FIG. 9 shows an overlay 900 of outcome set 216 and selection set 212 to illustrate common spots numbered 70 and 80. Spots that are common to both selection set 212 and outcome set 216 may be identified to the player on keno card 302 displayed by display device 106 using one or more of outlining, tagging, inverting, flashing, or other similar methods. In another example of step 514, spots common to both selection set 212 and outcome set 216 are shown with an animation of a coin over the spots where the numbers seventy and eighty would appear on keno card 302 of display device 106.

Figure 10:
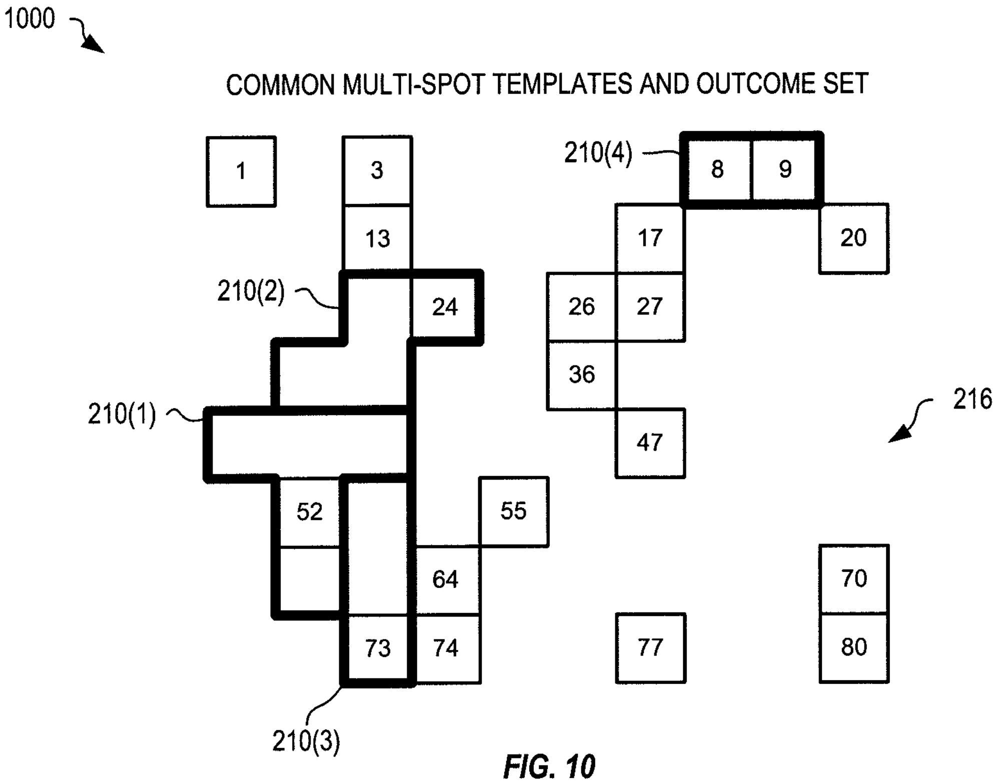
FIG. 10 shows an exemplary overlay of the templates of FIG. 4 onto the outcome set of FIG. 8.

In step 516, method 500 compares spots identified by the one or more located templates to the outcome set to determine common template spots. In one example of step 516, FIG. 10 shows an overlay 1000 of templates 210 onto outcome set 216 illustrating common spots numbered 52 within template 210 (1), 24 within template 210(2), 73 within template 210(3), and 8 and 9 within template 210(4).

Step 518 is a decision. If, in step 518, method 500 determines that the determined common template spots of step 516 trigger a bonus condition, method 500 continues with step 520; otherwise, method 500 continues with step 522. In one embodiment, each multi-spot template 210 is associated with the same bonus trigger condition. In another embodiment, each multi-spot template 210 is associated with a different bonus trigger condition. In one example, a bonus trigger condition 206 includes multiple spots within one or more multi-spot template 210 that are common with the outcome set 216. In another example, bonus trigger condition 206 includes all spots within a multi-spot template 210 also being within outcome set 216, as in the case of spot number 8 and 9 of template 210(4) as shown in FIG. 10.

In step 520, method 500 conducts bonus feature 208. In one example of step 520, bonus feature 208 represents one or more of free games, free picks, bonus payouts, payout multipliers, secondary or bonus games, or the like. A free pick is for example a randomly selected addition to the outcome set. In one embodiment, selection set 212 and templates 210 are evaluated against only the free pick spots and any additional award calculated. Thus, after the bonus feature is conducted, outcome set 216 may include twenty-five numbers (i.e., twenty numbers of the original outcome set 216 plus five "free picks" awarded through the bonus feature 208). In the embodiment shown in FIG. 5, the free picks are cumulative and method 500 returns to step 514, such that steps 514 through 516 are repeated when a bonus features is conducted. Selection set 212 and templates 210 are then re-evaluated against the expanded outcome set 216 and any additional award calculated.

In one embodiment, each multi-spot template 210 is associated with a different bonus feature 208. For example, two-spot template 210(4) may be associated with five free picks; three-spot template 210(3) may be associated with ten free picks; four-spot template 210(2) may be associated with fifteen free picks; and five-spot template 210(1) may be associated with twenty free picks, and so on.

Bonus feature 208 may result in a cascading or recursive effect where each bonus feature conducted causes further bonus trigger conditions 206 to be triggered. For example, if the free picks from bonus feature 208 triggered by two-spot template 210(4) resulted in outcome set 216 including all the spots contained within three-spot template 210(3), bonus feature 208 associated with three-spot template 210(3) is then conducted.

When no, or no further, bonus trigger conditions 206 are met, in step 522, method 500 pays any award due to the player based upon pay table and determined common spots and common template spots. In one example of step 522, processor 102 looks up the determined common spots (i.e., the number of matches between selection set 212 and outcome set 216) within pay table 204 and credits the player with the specified, if any, credits. In another example, the award is determined from pay table 204 and is issued through financial interface 114 in the form of one or more of coins, bills, tickets, or the like. In another example of step 522, the reward is determined from pay table 204 and added to a register of stored credits of the player. These stored credits may be cashed out from system 100 in some tangible form upon selection by the player. Method 500 then terminates.

System 100 may include other bonus features without departing from the scope hereof. In one embodiment, one or more bonus number are automatically selected at random by processor 102, and optionally shown on keno card 302 of display device 106. In an alternate embodiment, the player may select one or more bonus numbers using input device 108. Upon generation of outcome set 216, correspondence between the bonus numbers and outcome set 216 may provide payout multipliers or the like. For example, spot number 65 may be selected as a two-times multiplier bonus number and displayed as "2×" within keno card 302.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A computer-implemented system for conducting a wagering game played by a player, comprising:

at least one memory device that stores a multi-spot template having a predefined shape for covering a predefined number of a plurality of spots on a game set, the plurality of spots of the game set being consecutively numbered; and an input device for receiving, from the player, (1) a selection set comprising at least one of the plurality of spots on the game set and (2) a location, on the game set, of the multi-spot template.

2. The computer-implemented system of claim 1, wherein the input device receives a wager from the player and the computer-implemented system generates an outcome set based upon the game set.

3. The computer-implemented system of claim 2, further comprising the at least one memory device storing a pay table for determining an award payable to the player based upon matches between the outcome set, the selection set, and the plurality of spots covered by the multi-spot template at the location.

4. The computer-implemented system of claim 3, wherein a bonus feature is triggered based on a number of outcome set spots in common with the plurality of spots covered by the multi-spot template at the location.

5. A method for conducting a wagering game with a player on a wagering game system, the wagering game having a game set including a plurality of consecutively numbered spots thereon and a multi-spot template having a predefined shape for covering a predefined number of the plurality of consecutively numbered spots on the game set, the method comprising:

receiving, interactively from the player using an input device of the wagering game system, (1) a selection set comprising at least one of the plurality of the consecutively numbered spots on the game set and (2) a location, on the game set, of the multi-spot template;

determining, via at least one processor of the wagering game system, an outcome set based upon the game set;

comparing, via the at least one processor of the wagering game system, the plurality of spots of the game set covered by the multi-spot template at the location to the outcome set to determine a number of template covered outcome set spots;

determining, via the at least one processor of the wagering game system, if a bonus trigger condition is met based upon the number of template covered outcome set spots and a predetermined threshold; and performing a bonus feature if the bonus trigger condition is met.

6. The method of claim 5, wherein the multi-spot template covers two or more adjoining spots on the game set.

7. The method of claim 5, further comprising determining, via the at least one processor of the wagering game system, a pay table based upon a wager by the player, a number of spots in the selection set, and a number of spots covered by the multi-spot template.

8. The method of claim 7, further comprising determining, via the at least one processor of the wagering game system, an award to the player based upon the pay table and the number of spots common to the outcome set and one or both of (a) the selection set and (b) the number of template covered outcome set spots.

9. The method of claim 8, wherein the step of performing the bonus feature comprises selecting additional numbers for the outcome set and repeating the steps of comparing, determining and performing.

10. The method of claim 5, further comprising:

receiving, interactively from the player using the input device, at least one additional location for at least one additional multi-spot template for covering a predefined and a different number of the plurality of consecutively numbered spots of the game set not previously covered by the multi-spot template;

comparing, via the at least one processor of the wagering game system, the plurality of consecutively numbered spots covered by the at least one additional multi-spot template to the outcome set to determine a second number of template covered outcome set spots;

determining whether an additional bonus trigger condition is met based upon the second number of template covered outcome set spots; and performing an additional bonus feature if the additional bonus trigger condition is met.

11. A computer-implemented system for conducting a wagering game played by a player, comprising:

at least one memory device that stores at least one multi-spot template, associated with a bonus featured, having a predefined shape for covering a predefined number of a plurality of spots on a game set, wherein the plurality of spots of the game set are consecutively numbered; and an input device for receiving, from the player, a selection set comprising a plurality of spots on the game set; and at least one processor configured to randomly determine a valid location to place the at least one multi-spot template on the game set.

12. The computer-implemented system of claim 11, wherein the input device receives a wager from the player and the computer-implemented system generates an outcome set based upon the game set.

13. The computer-implemented system of claim 12, further comprising the at least one memory device storing a pay table for determining an award payable to the player based upon matches between the outcome set, the selection set, and the plurality of spots covered by the at least one multi-spot template at the randomly determined location.

14. The computer-implemented system of claim 13, wherein, a bonus feature is triggered based on a number of outcome set spots in common with the plurality of spots covered by the at least one multi-spot template at the randomly determined location.

* * * * *